Jan. 3, 1950    H. A. GENTHE    2,493,667
SNOWPLOW
Filed Dec. 8, 1947    2 Sheets-Sheet 1
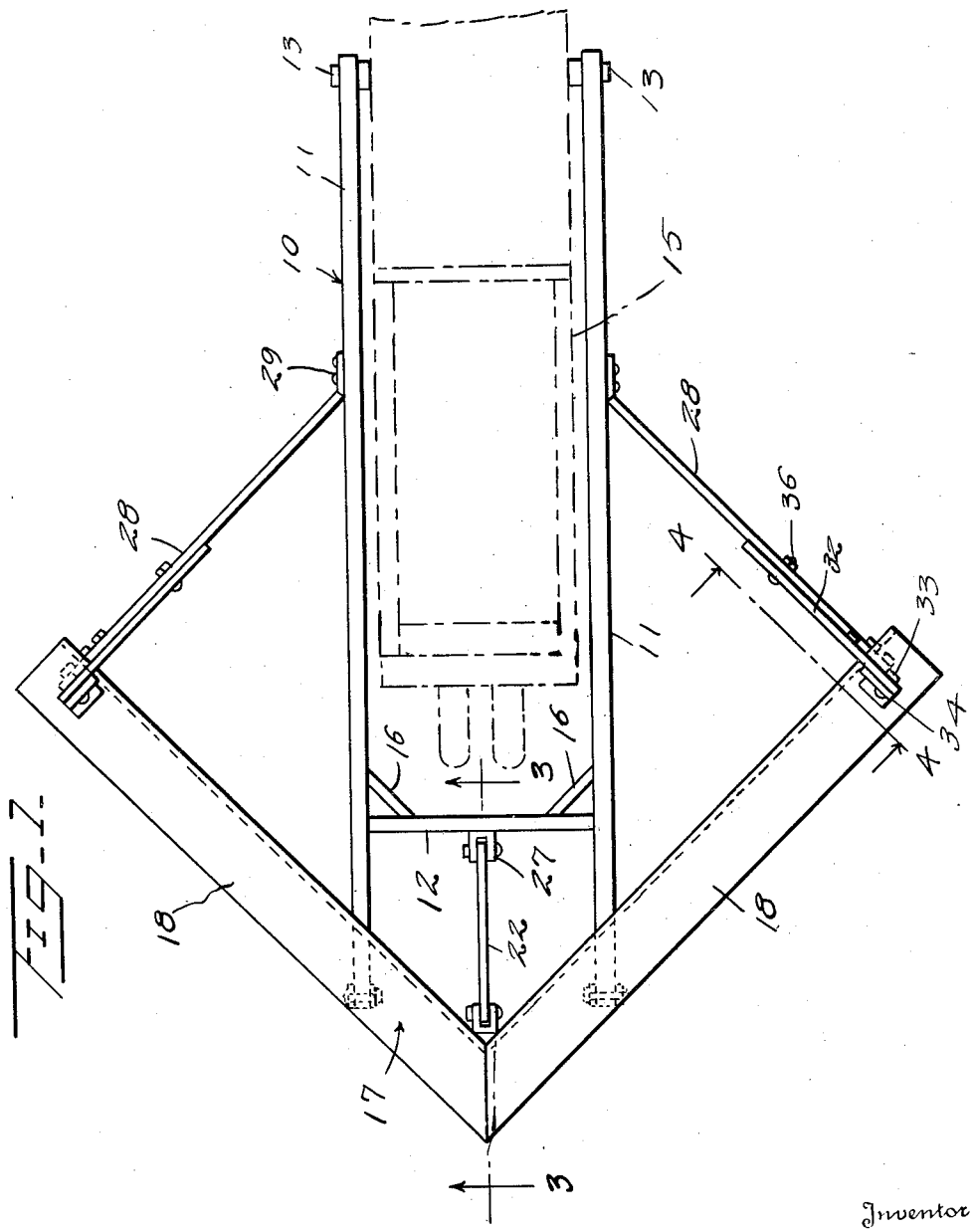
Inventor
Henry A. Genthe
By Kimmel & Crowell
Attorneys

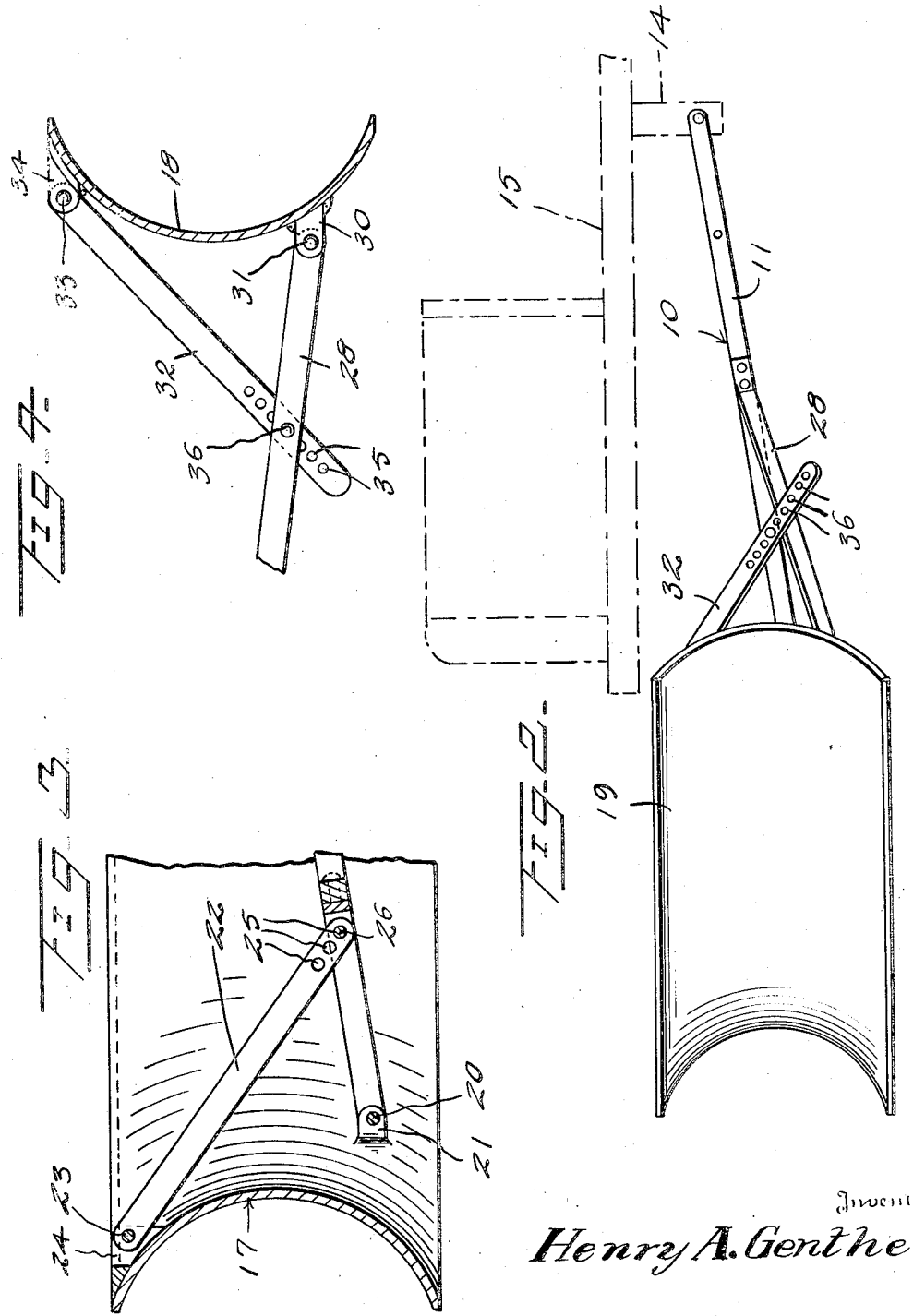

Patented Jan. 3, 1950

2,493,667

UNITED STATES PATENT OFFICE 2,493,667

SNOWPLOW

Henry A. Genthe, Burlington, Colo.

Application December 8, 1947, Serial No. 790,312

1 Claim. (Cl. 37—44)

This invention relates to snowplows.

An object of this invention is to provide a snowplow designed for attachment onto the front of a tractor and for connection to the elevating means on the tractor, so that the plow will form a cleared path ahead of the tractor.

Another object of this invention is to provide a plow of this kind including means whereby the plow may be angularly adjusted relative to the supporting frame so that the plow may be mounted on various types of tractors and properly adjusted so that the lower edges thereof will be horizontal when the plow is in lowered operative position.

To the foregoing objects, and others which may hereinafter more fully appear, the invention consists of the novel construction, combination and arrangement of parts, as will be more specifically referred to and illustrated in the accompanying drawings, but it is to be understood that changes, variations, and modifications may be resorted to which fall within the scope of the invention as claimed.

In the drawings:

Figure 1 is a plan view of a snowplow attachment for a tractor constructed according to an embodiment of this invention.

Figure 2 is a detailed side elevation of the device.

Figure 3 is a fragmentary sectional view taken on the line 3—3 of Figure 1.

Figure 4 is a fragmentary sectional view taken on the line 4—4 of Figure 1.

Referring to the drawings, the numeral 10 designates generally a frame which is adapted to be pivotally mounted on a tractor and to extend forwardly of the tractor. The frame 10 is formed of a pair of elongated side bars 11 connected together adjacent their forward ends by means of a connecting bar 12. The rear ends of the bars 11 are adapted to be pivotally mounted on pivot members 13 which are adapted to extend through depending supporting plates 14 which may be fixed to or may be formed as a part of the tractor frame or chassis 15. A pair of angularly disposed bracing bars 16 are connected between the outer portions of the connecting member 12 and the longitudinal bars 11.

A plow member generally designated as 17 is disposed at the forward end of the frame 10 and comprises a pair of forwardly convergent blades 18 which are fixed together at their convergent ends and these blades 18 are transversely curved with the concave sides 19 thereof foremost. The forward ends of the frame bars 11 are pivotally connected to the plow 17 by means of a pivot 20 which engages through a pair of ears 21 fixed to the rear convex sides of the blades 18 at a point closely adjacent the point of the plow.

A bracing bar 22 is adjustably connected between the frame 10 and the point of the plow at the upper end of the point. The bracing bar 22 is pivotally mounted on a pivot 23 fixed between a pair of ears 24 which are fixedly secured to the point of the plow 17. The bracing member 22 extends downwardly and rearwardly and is provided with a plurality of openings 25 through a selected one of which a pivot member 26 is adapted to engage. The pivot member 26 is carried by a pair of ears 27 which are secured to the transverse connecting bar 12. The outer ends of the blades 18 are adapted to be braced by means of braces 28 which at their rear ends are fixed as at 29 to the outer sides of the frame bars 11. The bracing members 28 extend downwardly and forwardly and are engaged between a pair of ears 30 fixed to the rear sides of the blades 18. A bolt 31 extends through the ears 30 and the forward ends of the bracing members 28. There is an adjustable bracing bar 32 for each bracing member 28 which is pivotally mounted on a pivot 33 carried by a pair of ears 34. The ears 34 are fixed to the upper portions of the blades 18 on the rear sides thereof and the bracing bars 32 extend downwardly and rearwardly being formed with a plurality of openings 35 through which bolts 36 engage. The bolts 36 extend through the bracing members 28 as shown in Figure 4.

In the use of this plow the frame 10 is adapted to be mounted at the rear end thereof on pivots 13 which are engaged with a suitable portion of the tractor frame. The frame 10 also has associated therewith an elevating or lifting means which may form a conventional portion of the tractor. This lifting means may be either hydraulic or mechanical and since this lifting means is conventional, it is not here shown. The plow 17 is initially adjusted through the medium of the adjustable bracing members 22 and 32 so that the lower edges of the blades 18 will be horizontal when the plow is in its lowered position. This plow will form a cleared path for the tractor and while it has been designed for clearing snow, it may be used for moving earth or the like. This plow is designed as an attachment for the front end of a tractor and can be easily and quickly mounted on the tractor and easily and quickly removed therefrom.

I claim:

A snow plow attachment for the front end of a tractor comprising a supporting frame including opposite side bars, pivot means connecting the rear ends of said bars to the tractor, a connecting bar extending between said side bars adjacent the forward ends thereof, a V-shaped plow at the forward end of said frame, pivotal connecting means adjacent the lower edge of said plow mounting said plow on the forward ends of said side bar, a central adjusting brace pivotally connected to the point of said plow adjacent the top edge thereof and extending downwardly and rearwardly therefrom, a plurality of spaced openings formed in said adjusting brace, a fitting carried centrally of said connecting bar including a locking pin adapted to selectively engage in one of said adjusting brace openings for angular adjustment of said plow, a forwardly and outwardly extending end brace fixedly carried by each of said side bars intermediate the length of the latter, the forward ends of said end braces being pivotally connected to the divergent ends of said plow adjacent the lower edge thereof, an end adjusting brace pivotally connected to each end of said plow adjacent the top edge thereof and extending downwardly and rearwardly therefrom, a plurality of spaced openings formed in each of said end adjusting braces, and a locking pin carried by each of said end braces adapted to selectively engage in said end adjusting brace openings.

HENRY A. GENTHE.

REFERENCES CITED

The following references are of record in the file of this patent:

UNITED STATES PATENTS

| Number | Name | Date |
|---|---|---|
| 1,713,030 | Cummings | May 14, 1929 |
| 2,336,124 | Phoenix | Dec. 7, 1943 |

FOREIGN PATENTS

| Number | Country | Date |
|---|---|---|
| 653,870 | Germany | Dec. 13, 1937 |